(12) United States Patent
Wu et al.

(10) Patent No.: US 10,775,685 B2
(45) Date of Patent: Sep. 15, 2020

(54) PROJECTOR

(71) Applicant: APPOTRONICS CHINA CORPORATION, Shenzhen (CN)

(72) Inventors: Xiliang Wu, Shenzhen (CN); Yongzhuang Chen, Shenzhen (CN); Yi Deng, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/559,022

(22) PCT Filed: Mar. 2, 2016

(86) PCT No.: PCT/CN2016/075307
§ 371 (c)(1),
(2) Date: Sep. 15, 2017

(87) PCT Pub. No.: WO2016/145988
PCT Pub. Date: Sep. 22, 2016

(65) Prior Publication Data
US 2018/0081261 A1    Mar. 22, 2018

(30) Foreign Application Priority Data

Mar. 16, 2015    (CN) .................... 2015 2 0148741 U

(51) Int. Cl.
*G03B 21/14*    (2006.01)
*G03B 21/54*    (2006.01)

(52) U.S. Cl.
CPC ........... *G03B 21/145* (2013.01); *G03B 21/54* (2013.01); *G03B 21/147* (2013.01)

(58) Field of Classification Search
CPC ..... G03B 11/04; G03B 11/043; G03B 11/045; G03B 11/048; G03B 21/14; G03B 21/54;
(Continued)

(56) References Cited

U.S. PATENT DOCUMENTS 5,617,167 A * 4/1997 Kaji .................. G03B 17/04
396/448
6,390,627 B1    5/2002 Kuroda
(Continued)

FOREIGN PATENT DOCUMENTS

CN        1243965 A    2/2000
CN     201540439 U    8/2010
(Continued)

OTHER PUBLICATIONS

International Search Report in the parent PCT application No. PCT/CN2016/075307, dated Jun. 8, 2016.
(Continued)

*Primary Examiner* — Michelle M Iacoletti
*Assistant Examiner* — Christopher A Lamb, II
(74) *Attorney, Agent, or Firm* — Chen Yoshimura LLP

(57) ABSTRACT

A projector, comprising a housing (100) and a machine body provided inside the housing (100). A supporting piece (200) is connected to the housing (100) via a connection mechanism, and the supporting piece (200) can be converted between a first position and a second position under the limiting action of the connection mechanism. The supporting piece (200) is attached to a surface of the housing (100) at the first position, and a projection element is triggered at the same time to enable the machine body to be in a first working state. The supporting piece (200) departs from the surface of the housing (100) at the second position and drives the housing (100) to change a projection elevation thereof with respect to a horizontal plane, and the projection element is triggered at the same time to enable the machine body to be in a second working state, thereby controlling the working states of the machine body on the premise of free adjustment of a projection angle.

18 Claims, 2 Drawing Sheets

(58) Field of Classification Search
CPC .............. G03B 21/145; G03B 21/2053; G03B 21/2086; G03B 21/147; G03B 21/142; G02B 23/16; H04N 9/3194; H04N 9/3155; H04N 9/3141; H04N 9/3185; H04N 9/00–898; H04N 9/31–3197; F16M 11/00–425; F16M 13/00–08
See application file for complete search history.

(56) References Cited

U.S. PATENT DOCUMENTS

| | | | |
|---|---|---|---|
| 8,714,756 B2 | 5/2014 | Yang | |
| 2005/0030494 A1* | 2/2005 | Kumai | A47B 37/02 353/119 |
| 2009/0109350 A1* | 4/2009 | Koyama | H04N 9/3155 348/759 |
| 2010/0073643 A1* | 3/2010 | Nasukawa | G03B 21/28 353/88 |
| 2010/0321643 A1* | 12/2010 | Ichikawa | G03B 21/28 353/98 |
| 2012/0081677 A1* | 4/2012 | Tanohata | G03B 21/145 353/57 |
| 2012/0309229 A1 | 12/2012 | Yang | |
| 2013/0242207 A1* | 9/2013 | Hiramatsu | H04N 5/7475 348/789 |

FOREIGN PATENT DOCUMENTS

| | | |
|---|---|---|
| CN | 102207671 A | 10/2011 |
| CN | 202221509 U | 5/2012 |
| CN | 204494035 U | 7/2015 |
| CN | 204694984 U | 10/2015 |
| JP | 2006227050 A | 8/2006 |

OTHER PUBLICATIONS

IPRP in the parent PCT application No. PCT/CN2016/075307, dated Sep. 19, 2017.

* cited by examiner

PROJECTOR

BACKGROUND OF THE INVENTION

Field of the Invention

This invention relates to projection technology, and in particular, it relates to a projector.

Description of Related Art

Conventional horizontal type projectors typically have one or more support feet with adjustable height on the bottom, for adjusting the angle of the projected image so that the image can be completely projected onto the desired screen.

SUMMARY

However, in current angle adjustment structures, because the feet are fixed at the bottom of the projector, they increase the overall thickness of the projector. This hampers the effort to develop super-thin projectors, and also increases the packaged size of the projectors.

Accordingly, embodiments of the present invention provide a projector, which solves the problem of increased overall thickness due to the projection angle adjustment structure in conventional projectors.

In one aspect, the present invention provides a projector, which includes: a housing; a projector body disposed inside the housing; a supporting piece mounted on the housing; a connection mechanism for mounting the supporting piece on the housing; a trigger element disposed on the housing; wherein the supporting piece moveable between a first position and a second position under restraint by the connection mechanism; wherein when the supporting piece is moved to the first position, it is disposed along a surface of the housing and triggers the trigger element to change the projector to a first working state, and wherein when the supporting piece is moved to the second position, it partly separates from the housing and causes the housing to change its projection angle relative to a horizontal surface, and triggers the trigger element to change the projector to a second working state.

Preferably, the trigger element is a projection lens opening, wherein when the supporting piece is moved to the first position, it covers the projection lens opening, and the first working state of the projector is a non-projecting state, and wherein when the supporting piece is moved to the second position, it exposes the projection lens opening, and the second working state of the projector is a projecting state.

Preferably, the trigger element is a power control device, wherein when the supporting piece is moved to the first position, it turns off the power control device, and the first working state of the projector is a powered off state, and wherein when the supporting piece is moved to the second position, it turns on the power control device, and the second working state of the projector is a powered on state.

Preferably, the trigger element includes a projection lens opening and a power control device, both located corresponding to the first position of the supporting piece; wherein when the supporting piece is moved to the first position, it covers the projection lens opening and turns off the power control device, and the first working state of the projector is a powered off state, and wherein when the supporting piece is moved to the second position, it exposes the projection lens opening turns on the power control device, and the second working state of the projector is a powered on state.

Preferably, the power control device is a light sensitive switch having a light sensing element exposed on an outside of the housing, wherein when the supporting piece is moved to the first position, it covers the light sensing element, and when the supporting piece is moved to the second position, it is located away from the light sensing element and exposes the light sensing element; or wherein the power control device is a mechanical switch having a press control portion which protrudes out of the housing, wherein when the supporting piece is moved to its first position, it presses the press control portion, and when the supporting piece is moved to its second position, the supporting piece moves away from the press control portion and releases it.

Preferably, the connection mechanism is a pivot, and wherein the supporting piece rotates or swings on the housing around a rotational axis.

Preferably, wherein the connection mechanism includes a rotational shaft, a shaft hole cooperating with the shaft, and a restraining element on the rotational shaft, wherein the restraining element is configured to restrain rotation of the shaft relative to the shaft hole, wherein the rotational shaft is formed on the supporting piece and the shaft hole is formed on the housing, or the rotational shaft is formed on the housing and the shaft hole is formed on the supporting piece.

Preferably, the rotational shaft is formed on the supporting piece and the shaft hole is formed on the housing, and wherein the restraining element is a one-directional bearing disposed over the rotational shaft, wherein the projector further comprises a bearing mounting base disposed on an inside of the housing corresponding to the shaft hole for accommodating the one-directional bearing, wherein one side of the bearing mounting base is open and the opening is covered by a pressure plate which is removably affixed to the bearing mounting base.

Preferably, an inner ring of the one-directional bearing and the rotational shaft are securely affixed together by a screw, and wherein the connection mechanism further includes a corrugated washer disposed in an elastically compressed manner between the one-directional bearing and the screw.

Preferably, the supporting piece is an integrally formed single piece component.

Preferably, the supporting piece is an integrally formed plate structure, wherein the housing includes an upper cover and a base joined with each other, wherein the base has a bottom panel and multiple side panels that extend vertically upwards from a periphery of the bottom panel, wherein the supporting piece is located on a front side panel of the base, and wherein the rotational axis of the supporting piece is perpendicular to the front side panel, or the rotational axis of the supporting piece is parallel to the front side panel.

Preferably, the rotational axis of the supporting piece is located at a center of a front side panel of the base, or the rotational axis of the supporting piece is located near the center of the front side panel of the base.

Embodiments of the present invention provide a projector, where the conventional support feet for angle adjustment are changed to a supporting piece. When the projector is not in use, the supporting piece is rotated to the first position, where it is disposed along a surface of the housing, and also triggers a trigger element to change the projector to a first working state. When the projector is to be used, the supporting piece is moved to the second position, where it partly separates from the housing and causes the housing to change its projection angle relative to a horizontal surface, and also triggers the trigger element to change the projector to a second working state. This structure integrates the projection lens cover and the support leg, which can achieve free adjustment of the projection angle and at the same time reduce the overall thickness of the projection. This can accommodate a super thin structural design of the projector and can reduce packaging cost.

The implementation, function and advantages of embodiments of the present invention are described in the embodiments, with reference to the drawings.

DETAILED DESCRIPTION OF PREFERRED EMBODIMENTS

The following descriptions are indented to explain the preferred embodiments and do not limit the scope of the invention.

Figure 1:
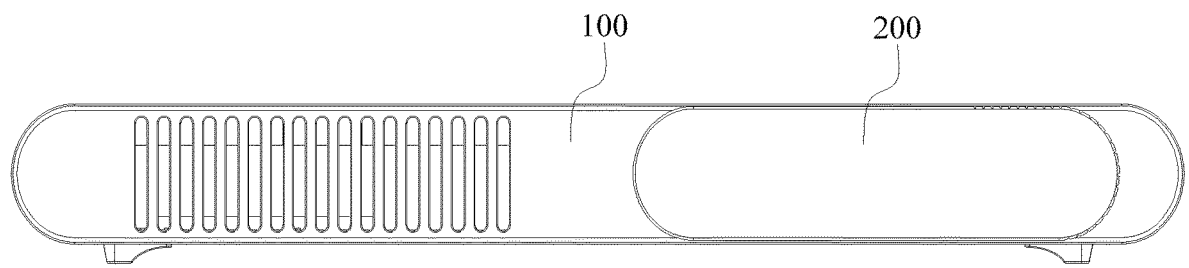
FIG. 1 is a front view of a projector according to an embodiment of the present invention, where the supporting piece is in the first position.
Figure 2:
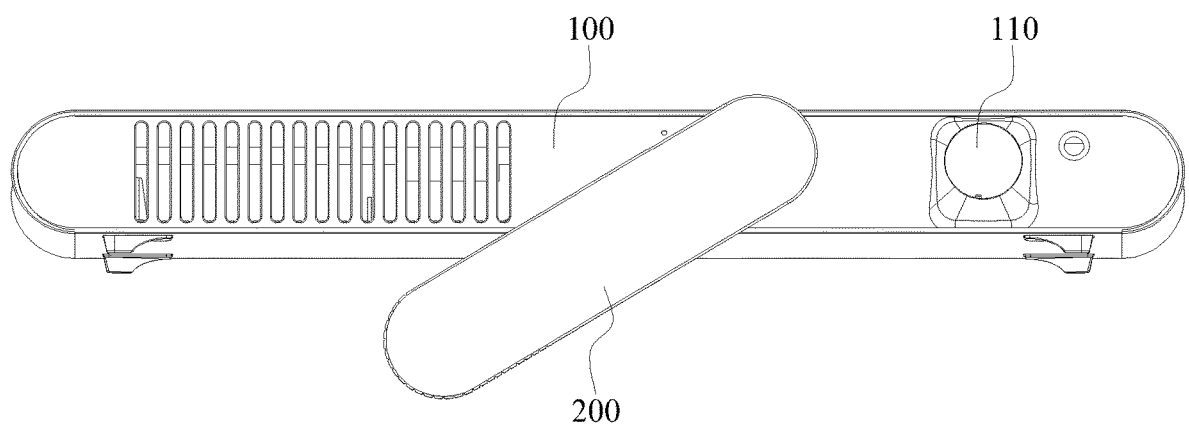
FIG. 2 is a front view of the projector of FIG. 1, but with the supporting piece in the second position.
Figure 3:
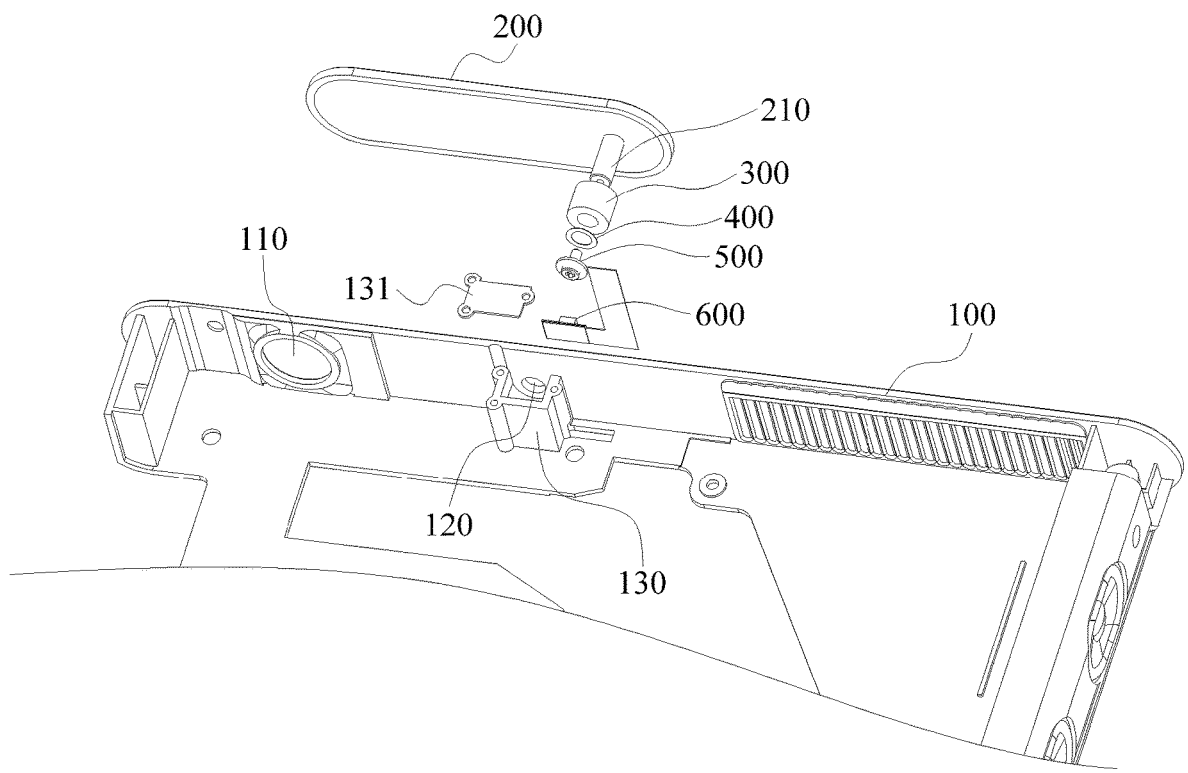
FIG. 3 is an exploded view of the projector, where some structures are not shown.

Embodiments of the present invention provide a projection, shown in FIGS. 1-3. In one embodiment, the projector includes a housing 100 and a body of the projector (not shown) disposed inside the housing. The housing 100 has a projection lens opening 110 corresponding to the projection lens of the projector. The body of the projector includes a control board, a light source, lenses, etc., for converting received signal to corresponding images and projecting the images onto the screen. The structure and operation principle of the body of the projector are well known to those skilled in the art and are not described in detail here.

Further, the housing 100 has a supporting piece 200 mounted on the housing via a connection mechanism. The supporting piece 200 is pivotally mounted on the housing 100, and can move between a first position and a second position under the restraint by the connection mechanism. Preferably, the rotational axis of the supporting piece 200 is parallel to the optical axis of the projection lens opening 110. It should be understood that the rotational axis of the supporting piece 200 and the optical axis of the projection lens opening 110 are spaced apart by a distance, and the supporting piece 200 can selectively cover the projection lens opening 110. Of course, the supporting piece 200 can alternatively be located far away from the projection lens opening 110 and only functions as a support and not as a lens cover. The connection mechanism provides a force for the supporting piece 200 to keep it at a desired location, thus, the supporting piece 200 will only rotate with an external force, which ensures the reliability of the supporting function of the supporting piece 200. When the supporting piece 200 is rotated to the first position, the supporting piece 200 is disposed along a surface of the housing 100, and also triggers a trigger element to cause the projector to be in a first working state. When the supporting piece 200 rotates to the second position, the supporting piece 200 partly separates from the housing 100, and causes the housing 100 to change its projection angle relative to the horizontal surface (e.g. the horizontal work surface the projection is sitting on), and also triggers the trigger element to cause the projector to be in a second working state. It should be noted that the first working state and the second working state are opposite working states; for example, the first working state may be a non-projecting state and the second working state may be a projecting state; or the first working state may be a powered off state and the second working state may be a powered on state; etc. By correlating the position of the supporting piece 200 and the working state of the projector, this structure is multi-functional, which can reduce the size of the projector and make its operation more convenient.

Preferably, the trigger element is the projection lens opening 110; when the supporting piece 200 is at its first position, the supporting piece 200 covers the projection lens opening 110 and the first working state of the projector is a non-projecting state, and when at its second position, the supporting piece 200 exposes the projection lens opening 110 and the second working state of the projector is a projecting state. When it covers the projection lens opening 110, the supporting piece 200 on the one hand triggers the projector to turn off projection, and at the same time prevents dust in the air from settling on the projection lens. When the supporting piece 200 is moved away from the projection lens opening 110, the projection lens opening 110 is exposed to the outside so light can be projected normally, and at the same time, the distal end of the supporting piece 200 (the end spaced away from its rotational axis) can prop up the front end of the projector, so as to change the projection angle of the projector.

It should be noted that the above mentioned first position of the supporting piece 200 is any position where it completely covers the projection lens opening 110, and the second position of the supporting piece 200 is any position where it completely exposes the projection lens opening 110 and the distal end of the supporting piece 200 protrudes from the bottom of the projector. When at the first position, the supporting piece 200 mainly functions to cover the projection lens opening 110, and when in the second position, it mainly functions to prop up the front of the projector.

In this embodiment, when the projector is not in use, the supporting piece 200 is rotated to the first position where it is disposed along the front surface of the housing 100, so it does not increase the thickness of the projector; it also covers the projection lens opening 110 and switches the projector to the non-projecting state, and at the same time prevent dust in the air from settling on the projection lens. When the projector is in use, the supporting piece 200 is rotated to the second position where it is moved away from the projection lens opening 110, where the distal end of the supporting piece 200 protrudes from the bottom of the projector to prop up the front end of the projector, so as to change the projection angle of the projector. This structure integrates the projection lens cover and the support leg, which can achieve free adjustment of the projection angle and at the same time reduce the overall thickness of the projection. This can accommodate a super thin structural design of the projector and can reduce packaging cost.

Preferably, in another embodiment, the trigger element is a power control device; when at its first position, the supporting piece 200 switches off the power control device and the first working state of the projector is a power off state, and when at its second position, the supporting piece 200 switches on the power control device and the second working state of the projector is a power on state. Thus, the supporting piece 200 of this embodiment also functions as a power switch; such linked control mechanism makes the operation more convenient and can conserve energy.

Preferably, in yet another embodiment, the trigger element includes both the projection lens opening 110 and the power control device, both of which are located in relation to the first position of the supporting piece 200. When the supporting piece 200 covers the projection lens opening 110, it also switches off the power control device so the first working state of the projector is a power off state; and when the supporting piece 200 moves away from the projection lens opening 110, it also switches on the power control device so the second working state of the projector is a power on state.

In implementation, the supporting piece 200 can be designed to control the power control device in two ways, namely contact control and a non-contact control. Referring to FIG. 3, in one embodiment, the power control device is a light sensitive switch 600, i.e., the supporting piece 200 controls the power control device in a non-contact manner. The light sensing element of the light sensitive switch 600 is exposed on the outside of the housing 100; for example, the light sensitive switch 600 may be affixed inside the housing 100 and the housing 100 has an opening to expose the light sensing element at a location corresponding to the supporting piece 200, so that when the supporting piece 200 is rotated to the first position, the supporting piece 200 covers the light sensing element; in such a state, the amount of light received by the light sensing element is reduced to switch off the light sensitive switch 600, thereby turning off the power supply to the projector. When the supporting piece 200 is rotated to the second position, the supporting piece 200 is moved away from the light sensing element so that the light sensing element is exposed; in such a state, the amount of light received by the light sensing element is increased to switch on the light sensitive switch 600, thereby turning on the power supply to the projector. Here, for example, the light sensing element may be a photoresistor; when the incident light is strong, its resistance decreases to make a power control circuit conductive, and when the incident light is weak, its resistance increases to cut off the power control circuit.

In another embodiment, the power control device is a mechanical switch (not shown in the drawings), i.e., the supporting piece 200 controls the power control device in a contact manner. The mechanical switch may be a micro-switch, push type switch, or any other suitable power source switch. The mechanical switch has a press control portion which protrudes out of the housing 100. The press control portion may have a wedge shaped surface where it forms sliding contact with the supporting piece 200; or, the press control portion may have a hemispherical shape where it protrudes from the outer surface of the housing 100. When the supporting piece 200 rotates to its first position, the supporting piece 200 presses the press control portion, to trigger the mechanical switch to turn off the power supply. When the supporting piece 200 rotates to its second position, the supporting piece 200 moves away from the press control portion and releases it. The press control portion is coupled to a resilient element, so that when the supporting piece 200 releases the pressure on the press control portion, the press control portion returns to an un-pressed state under the biasing force of the resilient element, to trigger the mechanical switch to turn on the power supply. Compared to the above non-contact switch, the mechanical switch is more reliable as it is not affected by environmental lighting conditions.

It should be mentioned that other than the light sensitive switch 600 and the mechanical switch described above, a proximity switch may be used as the power control device, such as capacitive type proximity switch or inductive type proximity switch.

In some embodiments, for ease of assembly and disassembly of the projector body, the housing 100 can be formed in two parts, such as an upper cover and a base that mate with each other. The upper cover may be a flat piece, and the base may have a bottom panel and multiple side panels that extend vertically upwards from the periphery of the bottom panel. The upper cover and the base may be joined by resilient tabs or screws. In one example, the housing 100 is approximately shaped as a low profile rectangular cuboid or a low profile square cuboid, and may have round corners to enhance its external aesthetics. In the illustrated embodiment, the upward extending side panels of the base include a front panel, a back panel, a left panel and a right panel. The projection lens opening 110 and the supporting piece 200 are located on the front side panel of the base, and the rotational axis of the supporting piece 200 is perpendicular to the front side panel, but it can also be parallel to the front side panel. More specifically, when the rotational axis of the supporting piece 200 is perpendicular to the front side panel of the base, the supporting piece 200 can rotate by 360 degrees or less than 360 degrees along the front side panel; when the rotational axis of the supporting piece 200 is parallel to the front side panel of the base, the supporting piece 200 can flip up and down.

In a preferred embodiment, the supporting piece 200 is an integrally formed single piece component, which has a simple structure and is more suitable for the structure and size requirement of micro-sized projectors. Further, using a single piece structure, it can avoid the possibility of breakdown due to multiple components which can affect the useful life of the supporting piece 200. Moreover, a single piece structure is easier to replace and repair, which reduces cost.

The structure of the supporting piece 200 may be, for example, a plate structure, or it may be a rod structure of other suitable curved shaped structure. A suitable shape may be selected based on the external shape of the housing 100, and the invention is not limited to any particular shape. For example, in the illustrated embodiment, to suit the external shape of the housing 100, the supporting piece 200 is preferably a flat plate structure, and the two length-wise ends may have a round shape. When the supporting piece 200 rotates to its first position, the supporting piece 200 can completely overlap with the front side panel of the base, so it will not take up much extra space, and make the exterior shape of the housing 100 simple and pleasing. As to the specific location of the rotational axis of the supporting piece 200, it should be set so that when the supporting piece 200 rotates to its first position it completely covers the projection lens opening 110, and when the supporting piece 200 rotates to its second position it can stably prop up the projector. For example, in the illustrated embodiment, the position of the rotational axis of the supporting piece 200 is slightly off center in the horizontal direction on the front side panel. This is helpful for adjusting the elevation angle of the projector.

Further, for ease of operation by the user, the supporting piece 200 is provided with an operating part (not shown in the drawings), where the user can apply a force to the operating part to rotate the supporting piece 200 between the first position and the second position. For example, the operating part may be an indentation or a protrusion on the side of the supporting piece 200 facing away from the housing 100. Further, the distal end of the supporting piece 200 may be provided by an anti-slip structure, which may be realized in various ways, such as thin grooves and ribs, or a soft gel type material adhered to the supporting piece 200, etc. When the supporting piece 200 rotates to its second position, its distal end is the support surface; thus, by providing the anti-slip structure, the friction of the support surface is increased to ensure that the projector is stably placed on the working surface.

In some embodiments, the connection mechanism is a pivot, such that the supporting piece can rotate or swing on the housing around a rotational axis, and the angle of the rotation or swing may be set as suitable, such as continuous rotation of 360 degrees, or less than 360 degrees. The pivot may use any one of a hole and a shaft friction cooperation, bearing cooperation, gear cooperation, chain cooperation, etc. In some embodiments, the connection mechanism includes a rotational shaft, a shaft hole cooperating with the shaft, and a restraining element on the rotational shaft. The restraining element functions to restrain the rotation of the shaft relative to the shaft hole, and the restraint may be a sufficiently high resistance, one-directional rotation, etc.

As an example, referring to FIG. 3, the rotational shaft 210 is formed on the supporting piece 200, and the shaft hole 120 is formed on the housing 100, where the rotational shaft 210 is inserted into the shaft hole 120. The restraining element may be a shaft sleeve which has sufficient resistance, or it may be, as in a preferred embodiment, a one-directional bearing 300. Also, it should be noted that the rotational shaft 210 and the shaft hole 120 may be swapped, i.e., the rotational shaft may be on the housing and the shaft hole may be on the supporting piece. The rotational shaft 210 is formed on the side of the supporting piece 200 that faces the housing 100. The rotational shaft 210 is provided with a threaded hole that recesses from its end. A bearing mounting base 130 is disposed on the inside of the housing 100 corresponding to the shaft hole 120 for accommodating the one-directional bearing 300. The bearing mounting base 130 and the housing 100 may be formed integrally, or formed separately and then affixed together. One side of the bearing mounting base 130 is open, and the opening is covered by a pressure plate 131 which is removably affixed to the bearing mounting base 130. For example, in this embodiment, the bearing mounting base 130 is a substantially cuboid shape, with its top side open, and the bearing cover 131 is affixed to the bearing mounting base 130 by screws. During assembling, the one-directional bearing 300 is placed around the rotational shaft 210, and is disposed inside the bearing mounting base 130. The inner ring of the one-directional bearing 300 and the rotational shaft 210 are securely affixed together by a screw 500 which is screwed into the threaded hole of the rotational shaft 210. The pressure plate 131 is used to fix the outer ring of the one-directional bearing 300 so that the outer ring cannot rotate with the rotational shaft 210. The one-directional bearing 300 serves two functions in this embodiment: First, it provides a stable support for the supporting piece 200, so that the supporting piece 200 can stably rotate around the rotational axis; second, it provides a force to keep the supporting piece 200 at desired positions, e.g., it ensures that the supporting piece 200 can only rotate in a clockwise direction or only rotate in a counter-clockwise direction, to satisfy the requirement of keeping the supporting piece at desired positions.

To prevent any slippage between the rotational shaft 210 and the one-directional bearing 300, which could defeat the one-directional rotation requirement of the supporting piece 200, the connection mechanism of this embodiment further includes a corrugated washer 400 which is disposed in an elastically compressed manner between the one-directional bearing 300 and the screw 500. The elastic restoring force of the corrugated washer 400 can securely fix the rotational shaft 210 and the inner ring of the one-directional bearing 300 together, and prevent them from becoming loose. In other embodiment, keys may be provided between the rotational shaft 210 and the one-directional bearing 300 to replace the corrugated washer 400, or both the corrugated washer 400 and the keys may be used in combination.

To realize the function of supporting the rotation and positioning of the supporting piece 200, the connection mechanism may alternatively have other structures. For example, the connection mechanism may use ratchet and corresponding pawl (not shown in the drawings), and the supporting piece 200 is restricted to one-direction rotation only by the ratchet device formed by the ratchet and the pawl. The ratchet is disposed over the rotational shaft 210. A screw screwed into the threaded hole of the 210 may be used to securely fix the ratchet and the rotational shaft 210 together, to prevent the relative rotation of the ratchet and the rotational shaft 210. The pawl is disposed on the inside of the housing 100 and cooperates with the ratchet. Compared to using the one-directional bearing 300, the structure of this alternative embodiment is more complex, but it can better provide the force needed to keep the supporting piece 200 at its desired position. It should be mentioned that the connection mechanism may also be a damper, which, by providing sufficient rotational damping force, can keep the supporting piece 200 from rotating when it is in a suspended position to prop up projector. Compared to the previous two types of connection mechanisms, the damper can provide unindexed adjustment of the supporting piece 200, so that the angle adjustment of the projector can be more precise.

It will be apparent to those skilled in the art that various modification and variations can be made in the projector of the present invention without departing from the spirit or scope of the invention. Thus, it is intended that the present invention cover modifications and variations that come within the scope of the appended claims and their equivalents.

What is claimed is:

1. A projector, comprising:
    a housing having a front side panel with a projection lens opening and a bottom panel which is non-parallel to the front side panel;
    a projector body disposed inside the housing, having a projection lens disposed at a position corresponding to the projection lens opening;
    a supporting piece mounted on the housing;
    a connection mechanism for mounting the supporting piece on the housing, wherein the connection mechanism includes a pivot;
    a trigger element disposed on the housing;
    wherein the supporting piece has a rotational axis which is perpendicular to the front side panel, and the supporting piece is moveable by rotating on the housing around the rotational axis between a first position and a second position under restraint by the connection mechanism;
    wherein when the supporting piece is moved to the first position, it is disposed along the front side panel of the housing and triggers the trigger element to change the projector to a first working state, and
    wherein when the supporting piece is moved to the second position, it partly separates from the housing and protrudes below the bottom panel of the housing and causes the housing to raise the front side panel relative to other portions of the housing and change an angle of the bottom panel relative to a horizontal surface, to change a projection angle of the projection lens relative to the horizontal surface, and triggers the trigger element to change the projector to a second working state.

2. The projector of claim 1, wherein the trigger element is a power control device,
wherein when the supporting piece is moved to the first position, it turns off the power control device, and the first working state of the projector is a powered off state, and
wherein when the supporting piece is moved to the second position, it turns on the power control device, and the second working state of the projector is a powered on state.

3. The projector of claim 2,
wherein the power control device is a light sensitive switch having a light sensing element exposed on an outside of the housing,
wherein when the supporting piece is moved to the first position, it covers the light sensing element, and when the supporting piece is moved to the second position, it is located away from the light sensing element and exposes the light sensing element;
or wherein the power control device is a mechanical switch having a press control portion which protrudes out of the housing, wherein when the supporting piece is moved to its first position, it presses the press control portion, and when the supporting piece is moved to its second position, the supporting piece moves away from the press control portion and releases it.

4. The projector of claim 1, wherein the connection mechanism includes a rotational shaft, a shaft hole cooperating with the shaft, and a restraining element on the rotational shaft, wherein the restraining element is configured to restrain rotation of the shaft relative to the shaft hole,
wherein the rotational shaft is formed on the supporting piece and the shaft hole is formed on the housing, or the rotational shaft is formed on the housing and the shaft hole is formed on the supporting piece.

5. The projector of claim 4, wherein the rotational shaft is formed on the supporting piece and the shaft hole is formed on the housing, and wherein the restraining element is a one-directional bearing disposed over the rotational shaft,
wherein the projector further comprises a bearing mounting base disposed on an inside of the housing corresponding to the shaft hole for accommodating the one-directional bearing, wherein one side of the bearing mounting base is open and the opening is covered by a pressure plate which is removably affixed to the bearing mounting base.

6. The projector of claim 5, wherein an inner ring of the one-directional bearing and the rotational shaft are securely affixed together by a screw, and wherein the connection mechanism further includes a corrugated washer disposed in an elastically compressed manner between the one-directional bearing and the screw.

7. The projector of claim 1, wherein the supporting piece is an integrally formed single piece component.

8. The projector of claim 7, wherein the supporting piece is an integrally formed plate structure,
wherein the housing includes an upper cover and a base joined with each other, wherein the base includes the bottom panel and multiple side panels including the front side panel that extend vertically upwards from a periphery of the bottom panel, wherein the supporting piece is located on the front side panel of the base.

9. The projector of claim 7, wherein the rotational axis of the supporting piece is located at a center of the front side panel of the base, or the rotational axis of the supporting piece is located near the center of the front side panel of the base.

10. A projector, comprising:
a housing having a front side panel with a projection lens opening and a bottom panel which is non-parallel to the front side panel;
a projector body disposed inside the housing, having a projection lens disposed at a position corresponding to the projection lens opening;
a supporting piece mounted on the housing;
a connection mechanism for mounting the supporting piece on the housing, wherein the connection mechanism includes a pivot;
wherein the supporting piece has a rotational axis which is perpendicular to the front side panel, and the supporting piece is moveable by rotating on the housing around the rotational axis between a first position and a second position under restraint by the connection mechanism;
wherein when the supporting piece is moved to the first position, it is disposed along the front side panel of the housing and covers the projection lens opening, and
wherein when the supporting piece is moved to the second position, it partly separates from the housing and protrudes below the bottom panel of the housing and causes the housing to raise the front side panel relative to other portions of the housing and change an angle of the bottom panel relative to a horizontal surface, to change a projection angle of the projection lens relative to the horizontal surface, and exposes the projection lens opening.

11. The projector of claim 10, further comprising a power control device, located corresponding to the first position of the supporting piece;
wherein when the supporting piece is moved to the first position, it turns off the power control device, and
wherein when the supporting piece is moved to the second position, it turns on the power control device.

12. The projector of claim 11,
wherein the power control device is a light sensitive switch having a light sensing element exposed on an outside of the housing,
wherein when the supporting piece is moved to the first position, it covers the light sensing element, and when the supporting piece is moved to the second position, it is located away from the light sensing element and exposes the light sensing element;
or wherein the power control device is a mechanical switch having a press control portion which protrudes out of the housing, wherein when the supporting piece is moved to its first position, it presses the press control portion, and when the supporting piece is moved to its second position, the supporting piece moves away from the press control portion and releases it.

13. The projector of claim 10, wherein the connection mechanism includes a rotational shaft, a shaft hole cooperating with the shaft, and a restraining element on the rotational shaft, wherein the restraining element is configured to restrain rotation of the shaft relative to the shaft hole,
wherein the rotational shaft is formed on the supporting piece and the shaft hole is formed on the housing, or the rotational shaft is formed on the housing and the shaft hole is formed on the supporting piece.

14. The projector of claim 13, wherein the rotational shaft is formed on the supporting piece and the shaft hole is formed on the housing, and wherein the restraining element is a one-directional bearing disposed over the rotational shaft, wherein the projector further comprises a bearing mounting base disposed on an inside of the housing corresponding to the shaft hole for accommodating the one-directional bearing, wherein one side of the bearing mounting base is open and the opening is covered by a pressure plate which is removably affixed to the bearing mounting base.

15. The projector of claim 14, wherein an inner ring of the one-directional bearing and the rotational shaft are securely affixed together by a screw, and wherein the connection mechanism further includes a corrugated washer disposed in an elastically compressed manner between the one-directional bearing and the screw.

16. The projector of claim 10, wherein the supporting piece is an integrally formed single piece component.

17. The projector of claim 16, wherein the supporting piece is an integrally formed plate structure, wherein the housing includes an upper cover and a base joined with each other, wherein the base includes the bottom panel and multiple side panels including the front side panel that extend vertically upwards from a periphery of the bottom panel, wherein the supporting piece is located on the front side panel of the base.

18. The projector of claim 16, wherein the rotational axis of the supporting piece is located at a center of the front side panel of the base, or the rotational axis of the supporting piece is located near the center of the front side panel of the base.

* * * * *